| United States Patent [19] | [11] | 4,167,395 |
|---|---|---|
| Engelhardt et al. | [45] | Sep. 11, 1979 |

[54] WATER-SOLUBLE BRANCHED POLYESTERS

[75] Inventors: Friedrich Engelhardt; Karl Hintermeier, both of Frankfurt; Joachim Ribka, Offenbach-Burgel; Helmut Beutler, Kelkheim, all of Fed. Rep. of Germany

[73] Assignee: Cassella Aktiengesellschaft, Frankfurt Fechenheim, Fed. Rep. of Germany

[21] Appl. No.: 796,152

[22] Filed: May 12, 1977

[30] Foreign Application Priority Data

May 15, 1976 [DE] Fed. Rep. of Germany ....... 2621653

[51] Int. Cl.² .................. C08G 63/66; C08G 63/68
[52] U.S. Cl. ............................. 8/173; 8/89 R; 8/89 A; 528/173; 528/293; 528/294; 528/295
[58] Field of Search ............ 260/49, 755; 8/173, 8/89 R, 89 A; 528/173, 293, 294, 295

[56] References Cited

U.S. PATENT DOCUMENTS

| 3,018,272 | 1/1962 | Griffing et al. | 260/75 |
| 3,033,824 | 5/1962 | Huffman | 260/75 |
| 3,528,947 | 9/1970 | Lappin et al. | 260/75 |
| 3,657,193 | 4/1972 | Caldwell | 260/76 |
| 3,882,185 | 5/1975 | Radlmann et al. | 260/75 S |

*Primary Examiner*—Lester L. Lee
*Attorney, Agent, or Firm*—Connolly and Hutz

[57] ABSTRACT

Water-soluble polyester having an apparent molecular weight between about 600 and about 5,000 and a $SO_3M$ group content between about 5 to about 40 mol percent based on the number of mols of dicarboxylic and/or polycarboxylic acids esterified in the polyester, and an at least trifunctional alcohol and/or an at least trifunctional carboxylic acid content between about 1 to about 40 mol percent based on the number of mols of dicarboxylic and/or polycarboxylic acids esterified in the polyester so that the polyester is correspondingly branched and M denotes a cation of an alkali metal, the ammonium ion or the cationic radical of an organic amine. The improved polyester is particularly suited as a levelling agent in the disperse dyeing of polyester fibers or the like.

11 Claims, No Drawings

WATER-SOLUBLE BRANCHED POLYESTERS

The present invention relates to water-soluble polyesters such as those described in German Offenlegungsschrift No. 1,816,163.

Among the objects of the present invention is the provision of improved water-soluble polyesters.

The foregoing as well as additional objects of the present invention will be more fully understood from the following description of several of its exemplifications.

According to the present invention an improved water-soluble polyester has an apparent molecular weight between about 600 and about 5,000, a SO₃M group content between about 5 to about 40 mol percent based on the number of mols of dicarboxylic and/or polycarboxylic acids esterified in the polyester and an at least trifunctional alcohol and/or an at least trifunctional carboxylic acid content between about 1 to about 40 mol percent based on the number of mols of dicarboxylic and/or polycarboxylic acids esterified in the polyester, so that the polyester is correspondingly branched and M denotes a cation of an alkali metal, the ammonium ion or the cationic radical of an organic amine.

Preferred water-soluble polyesters of the present invention have an apparent molecular weight ranging from about 700 to about 4,000, or have from about 5 to 40 mol percent of the acid and alcohol that is at least trifunctional, or have a SO₃M content from about 10 to 30 mol percent, or have two or three feature together.

Dicarboxylic acids suitable for the manufacture of the polyesters of the present invention are, in the first place, all dicarboxylic acids

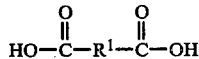

or corresponding acid halides, anhydrides or esters thereof which supply to the final polyester the radical

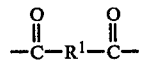

wherein $R^1$ represents a direct bond or a divalent, aliphatic, cycloaliphatic or aromatic radical and this radical can also carry a SO₃M group. $R^1$ preferably denotes a divalent, aliphatic radical having 2 to 10 carbon atoms, a divalent, cycloaliphatic radical having 6 to 8 carbon atoms, or a divalent, aromatic radical having 6 to 12 carbon atoms. The following are examples of dicarboxylic acids for supplying the dicarboxylic acid group:

oxalic acid, malonic acid, succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, fumaric acid, maleic acid, itaconic acid, 1,2-cyclohexanedicarboxylic acid, 1,3-cyclohexanedicarboxylic acid, 1,4-cyclohexanedicarboxylic acid, norbornanedicarboxylic acid, phthalic acid, isophthalic acid, terephthalic, 1,4-naphthalenedicarboxylic acid, 2,5-naphthalenedicarboxylic acid, diphenic acid, diglycollic acid, thiodipropionic acid, 4,4'-oxydibenzoic acid, 4,4'-sulphonyldibenzoic acid, sulphosuccinic acid.

As between esters, anhydrides and acid halides, the acid chlorides are preferred reactants. Esters which can be used are those with monoalcohols which can be readily removed by distillation, that is to say, preferably monoalcohols having 1 to 4 carbon atoms. On the other hand, however, esters with diols can also be used as transesterification reactants. The following are examples of esters, anhydrides and acid chlorides which are suitable reactants for supplying the dicarboxylic acid group:

terephthalic acid dimethyl ester, terephthalic acid diethyl ester, terephthalic acid dipropyl ester, terephthalic acid diisopropyl ester, terephthalic acid dibutyl ester, isophthalic acid dimethyl ester, isophthalic acid diethyl ester, isophthalic acid dipropyl ester, isophthalic acid dibutyl ester, isophthalic acid diisobutyl ester, phthalic acid dimethyl ester, phthalic acid diethyl ester, phthalic acid dipropyl ester, phthalic acid diisopropyl ester, phthalic acid dibutyl ester, malonic acid dimethyl, diethyl, dipropyl or dibutyl ester, succinic acid dimethyl or dibutyl ester, glutaric acid diethyl or diisopropyl ester, adipic acid diethyl or diisobutyl ester,

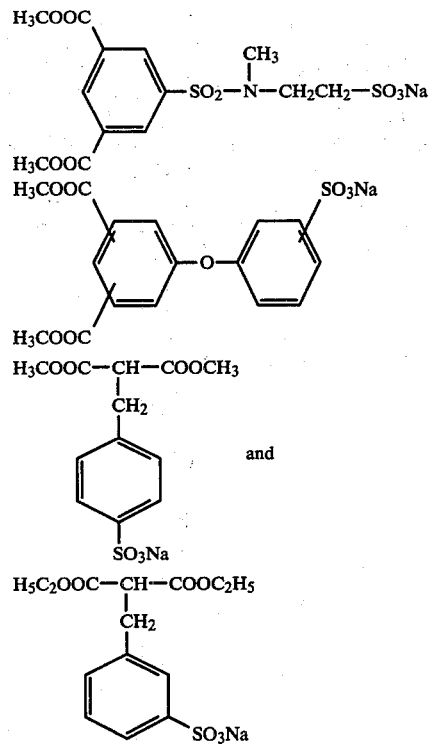

pimelic acid dimethyl, diisopropyl or dibutyl ester, suberic acid dimethyl, diethyl, dipropyl or dibutyl ester, 1,4-cyclohexanedicarboxylic acid dimethyl, diethyl, dipropyl or dibutyl ester, 1,2-cyclohexanedicarboxylic acid dimethyl, diethyl, diproply or dibutyl ester, 1,3-cyclohexanedicarboxylic acid dimethyl, diethyl, dipropyl or dibutyl ester, phthalic anhydride, maleic anhydride, succinic anhydride and phthalyl chloride.

Diol components which can be used for the manufacture of the polyesters of the present invention are in the first place all diols

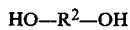

which supply the final polyester the radical

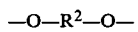

wherein $R^2$ represents a divalent, aliphatic, cycloaliphatic or araliphatic radical which can, in addition, also carry a $SO_3M$ group. In particular, $R^2$ denotes a divalent, aliphatic radical having 2 to 10 carbon atoms, preferably such radicals which also contain ether bridges and have molecular weights up to about 2,000. For such high molecular weights there are up to about 40 $C_2$ to $C_{10}$ radicals bridged together, as in polyethylene glycols or ethylene-propylene-polyglycols. $R_2$ also denotes a divalent, cycloaliphatic radical having 6 to 10 carbon atoms or a divalent, araliphatic radical having 8 to 14 carbon atoms.

The following are examples for suitable diols: ethylene glycol, 1,2-propanediol and 1,3-propanediol, butanediols, particularly 1,4-butanediol, pentanediols, such as 1,5-pentanediol, hexanediols, particularly 1,6-hexanediol, 1,10-decanediol, di-ethylene glycol, dipropylene glycol, triethylene glycol, tetra-ethylene glycol, tripropylene glycol, polyethylene glycol of molecular weight 300–2,000, bis-(4-hydroxybutyl) ether, 2-methylene-1,3-propanediol, 2,4-dimethyl-2-ethyl-1,3-hexanediol, 2-ethyl-2-butyl-1,3-propanediol, 2,2-dimethyl-1,3-propanediol, 2-ethyl-2-isobutyl-1,3-propanediol, 2,2,4-trimethyl-1,6-hexanediol, 1,3-dihydroxy-cyclohexane, 1,4-dihydroxy-cyclohexane (quinitol), 1,4-bis-(hydroxymethyl)-cyclohexane, 1,3-bis-(hydroxymethyl)-cyclohexane, 1,2-bis-(hydroxymethyl)-cyclohexane, 1,4-bis-(hydroxymethyl)-benzene, 1,3-bis-(hydroxymethyl)-benzene, 2,6-bis-(hydroxymethyl)-naphthalene,

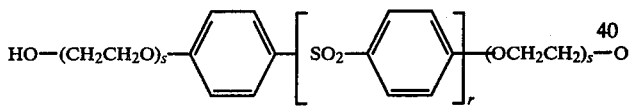

wherein r is 0 or 1 and s is 1, 2, 3 or 4, such as

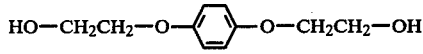

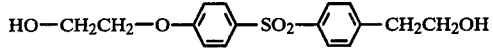

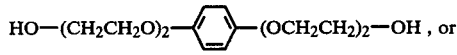

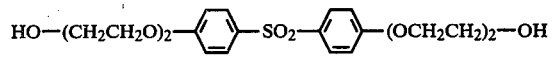

and

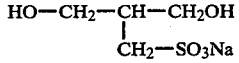

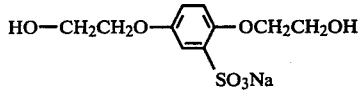

The polyesters of the present invention preferably contain radicals of the formula

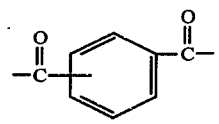

in an amount of at least 40 mol percent of all the dicarboxylic acid groups in the polyester. This means that it is suitable, in the manufacture of the polyester, to employ at least 40 mol percent of phthalic acid, isophthalic acid or terephthalic acid or mixtures thereof.

These acids, as indicated above can be introduced into the reaction mixture as their esters, anhydrides or acid chlorides. Particularly good results are obtained if at least 40 mol percent of all the dicarboxylic acid groups have the formula

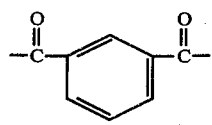

Instead of the dicarboxylic acids and diols it is also possible to use hydroxycarboxylic acids or derivatives, especially esters thereof, which can for example introduce into the final polyester the structure

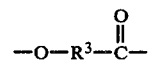

wherein $R^3$ represents a divalent, aliphatic, cycloaliphatic or araliphatic radical which can, in addition, also contain a $SO_3M$ group. Particularly desired $R^3$ groups are divalent aliphatic radicals having 1 to 10 carbon atoms, divalent cycloaliphatic radicals having 6 to 11 carbon atoms or divalent araliphatic radicals having 8 to 12 carbon atoms. In the araliphatic radical the aliphatic part can be interrupted or separated from the aromatic part by a hetero-atom such as oxygen. The following are examples of suitable hydroxycarboxylic acids: glycollic acid, lactic acid, 3-hydroxypropionic acid, 4-hydroxybutyric acid, 5-hydroxy-3-pentenoic acid, mandelic acid, 3-hydroxymethyl-cyclohexane-carboxylic acid, 4-hydroxymethyl-cyclohexane-carboxylic acid and 6-hydroxymethyl-decalin-2-carboxylic acid, citric acid, malic acid, tartaric acid,

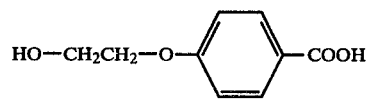

and

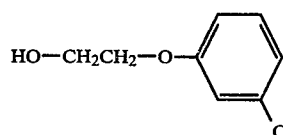

These can be reacted as such or in the form of their esters with lower alcohols having 1–4 C atoms, especially their methyl or ethyl ester, by way of example.

The following should be mentioned as examples of hydroxycarboxylic acid esters which carry SO₃M groups:

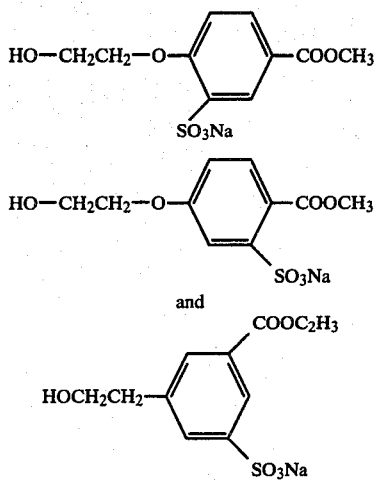

It can be seen from the examples mentioned that the SO₃M group can be attached either directly or indirectly, for example via radicals such as —OCH₂CH₂—, —O—CH₂CH₂CH₂— or

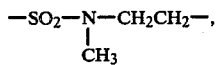

to the actual carbon skeleton of the acid or alcohol being reacted.

Further examples for suitable dicarboxylic acids, anhydrides or acid chlorides thereof, which carry a SO₃M group are:
sodium-sulphosuccinic acid, potassium-sulphosuccinic acid, ammonium-sulphosuccinic acid, 4-sodium-sulphophthalic acid, 4-sodium-sulphophthalic anhydride, 4-potassium-sulphophthalic acid, 2-sodium-sulphoterephthalic acid, 2-sodium-sulphoterephthalic acid dichloride, 5-sodium-sulphoisophthalic acid, 5-sodium-sulphopropoxy-isophthalic acid, 5-sodium-sulphoethoxy-isophthalic acid, sodium-sulpho-succinic acid dimethyl ester, sodium-sulphosuccinic acid diethyl ester, 4-sodium-sulphophthalic acid diethyl ester, 4-sodium-sulphophthalic acid dimethyl ester, 4-ammonium-sulphophthalic acid dimethyl ester, 2-sodium-sulphoterephthalic acid diethyl ester, 5-sodium-sulphoisophthalic acid-dimethyl ester, 5-sodium sulphopropoxy-isophthalic acid dimethyl ester, 5-sodium-sulphoethoxy-isophthalic acid diethyl ester, 5-sodium-sulphoethoxy-isophthalic acid diisopropyl ester, 5-potassium-sulphoethoxy-isophthalic acid di-n-propyl ester.

The polyesters of the present invention are branched. In order to manufacture these polyesters it is necessary to use, components by means of which branching is incorporated into them.

Branching components of this type can be:
(a) Polycarboxylic acids having 3, 4 or 5, preferably 3, carboxyl groups, or their esters especially those with lower alcohols having 1 to 4 C atoms, their anhydrides, or their acid chlorides.
(b) Polyhydroxy compounds having 3, 4 or 5, preferably 3, hydroxyl groups.
(c) Hydroxycarboxylic acids having at least one hydroxyl and at least one carboxylic acid group, and having at least one but up to 3 more of either or both of such groups, to make a total of up to 5, and their derivatives, especially their esters with lower alcohols having 1 to 4 C atoms.

Suitable branching polycarboxylic acids, as mentioned under (a) above are for example:
trimellitic acid, trimesic acid, hemimellitic acid, mellophanic acid, prehnitic acid, pyromellitic acid, aconitic acid, tricarballylic acid and ethanetetracarboxylic acid. 1,2,3-cyclohexanetricarboxylic acid, 1,2,4-cyclohexanetricarboxylic acid, 1,3,5-cyclohexanetricarboxylic acid and naphthalenetricarboxylic acids.

Suitable branching anhydrides are for example: trimellitic anhydride, pyromellitic dianydride, hemimellitic anhydride, mellophanic dianhydride and prehnitic anhydride.

Suitable branching esters are, especially those with alcohols having 1 to 4 carbon atoms, such as, for example:
trimellitic acid trimethyl ester, trimellitic acid triethyl ester, trimesic acid trimethyl ester, hemimellitic acid trimethyl ester, mellophanic acid tetramethyl ester, prehnitic acid tetramethyl ester, pyromellitic acid tetramethyl ester and pyromellitic acid tetraethyl ester.

Suitable branching polyhydroxy compounds as mentioned under (b) above are for example:
glycerol, erythritol, pentaerythritol, trimethylolpropane and trimethylolethane.

Suitable branching hydroxycarboxylic acids as mentioned under (c) above are for example:
citric acid, malic acid and tartaric acid.

Suitable esters of these hydroxycarboxylic acids are for example:
citric acid trimethyl ester, malic acid dimethyl ester and tartaric acid dimethyl ester.

The polyester of the present invention is readily made by interesterifying a mixture of the acids and the alcohols generally by heating to temperatures of 100° to 280° C., preferably 150° to 230° C., and best in an inert atmosphere such as under nitrogen or carbon dioxide. Volatile by-products such as water and/or alcohols which are formed or are contained in the reactants are preferably removed during the esterification, as by subjecting the reaction mixture to evacuation to a pressure of 10 to 15 Tor, or even down to 0.5 Tor, to cause these by-products to distill off. The condensation reaction normally lasts 3 to 15 hours and is continued until the desired molecular weight has been reached, Care should be exercised to ensure that the desired branching does not result in excessive cross-linking that renders the product insoluble in water and unsuitable for the present invention.

In the condensation reaction, all the reactants can be subjected to the polycondensation reaction from the start, that is to say they can all be initially mixed together. They can also, however, be added in any desired sequence at intervals of time, so that the portions added first can form precondensates. It is appropriate not to add the reactants that effect branching such as for example pentaerythritol, until a relative late point of the condensation reaction is reached.

The condensation reaction can be carried out as an esterification, transesterification or acylation, or as any combination of these techniques. Esterification catalysts (alkali metal alcoholates, titanium alcoholates, manganese acetate, zinc acetate and the like) can be used but can also be entirely absent.

For example, it is possible to add the desired di- and/or polycarboxylic acids and/or hydrocarboxylic acids in the form of their esters, especially their methyl or ethyl esters and to also use a transesterification catalyst such as sodium hydroxide or potassium hydroxide, or alkali metal alcoholates, such as sodium methylate or ethylate, alkaline earth metal oxides or hydroxides, such as, for example, the corresponding calcium or magnesium compounds, and, furthermore, also zinc oxide or cadmium oxide, salts of organic carboxylic acids, such as sodium acetate or formate, calcium acetate or formate or zinc acetate or formate, or organic titanium compounds, particularly titanium alcoholates, such as, for example, titanium isopropylate or titanium butylate. The quantities to be used depend above all on the activity of the particular catalyst. The quantity of catalyst is normally kept as small as possible.

The apparent molecular weight of the polyester formed is determined in a vapor pressure osmometer using dimethylformamide as the solvent. The determination of the molecular weight using a vapor pressure osmometer is described by W. Simon and C. Tomlinson in Chimia 14 (1960), 301-308. Owing to the dissociation of the sulphonate groups, the actual molecular weight is higher than the apparent value measured in this way. The measured value is, however, a sufficiently accurate criterion for characterising the degree of condensation of the polymeric mixed esters according to the present invention and for determining the end point of the condensation reaction.

If in carrying out the polycondensation reaction, at least one reactant possesses a SO$_3$M group, the polyesters according to the present invention can be obtained direct. It is, however, also possible to obtain the desired polyesters by first preparing the desired branched polyester structure containing olefinic unsaturation, and then introducing SO$_3$M groups subsequently into such polyester by reaction with bisulphite. Normally, 5 to 40 mol percent of such an olefinically unsaturated reactant, preferably 10 to 30 mol percent, relative to the total polycarboxylic acid reactant is employed and the other reactants are selected as indicated above. Suitable compounds having unsaturated C—C bonds are, in particular, maleic acid, fumaric acid and itaconic acid as well as lower esters and anhydrides thereof. A quantity of a HSO$_3$M solution, especially a HSO$_3$Na solution, which is equivalent to the unsaturated C—C bonds present in the polyester is subsequently added at an elevated temperature of 50° to 100° C., preferably 90° to 100° C., to the branched and unsaturated polyester manufactured in this way.

In order to manufacture the polyesters of the present invention, 80 to 140 mol percent of the alcoholic component consisting of diols and branching polyhydroxy compounds are normally employed relative to 100 mol percent of the carboxylic acid component consisting of the dicarboxylic acids and branching polycarboxylic acids, and the components are selected in such a way that, relative to 100 mol percent of the carboxylic acid component, 5 to 40 mol percent, preferably 10 to 30 mol percent of SO$_3$M groups are present or, if the SO$_3$M groups are introduced by an addition reaction with a ready-made SO$_3$M-free copolyester, 5 to 40 mol percent, preferably 10 to 30 mol percent, of unsaturated C—C bonds are present. Normally, 1 to 40 mol percent, preferably 5 to 40 mol percent of branching components are employed, relative to 100 mol percent of the carboxylic acid component. It is advantageous for at least 40 mol percent of the dicarboxylic acids to consist of benzene-dicarboxylic acids and particularly of isophthalic acid. It is furthermore advantageous if the compounds of the alcoholic component consisting of diols and branching polyhydroxy compounds are selected in such a way that at least 40 mol percent of diethylene glycol and/or triethylene glycol are employed, relative to 100 mol percent of the diols and branching polyhydroxy compounds.

If hydroxycarboxylic acids and/or branching hydroxycarboxylic acids are employed in the manufacture of the polyester, it is then necessary, in establishing the mol percentages, to apportion these compounds arithmetically to the carboxylic acid and alcoholic component or to the branching component in conformity with the number of hydroxyl and carboxyl groups present. Thus, in calculating the mol percentages, a hydroxycarboxylic acid having one hydroxy and one carboxylic group is, for example, included as to one half with the dicarboxylic acids and as to the other half with the diols. In the manufacture of the copolyesters the components are incorporated statistically. For this reason, and because of the branchings which are present, it is no longer possible to indicate a simple formula for the copolyester according to the invention.

The polyesters of the present invention are suitable for many kinds of applications, in particular they are outstandingly suitable as levelling auxiliaries in polyester dyeing, above all for rapid dyeing processes. They are also suitable as hair setting lotions, as sizes, as water-soluble adhesives and as an additive for adhesives and also as a modifying agent for melamine resins or other aminoplast resins, together with the manifold end uses which are linked therewith.

There are extensive possibilities for variation, depending on the choice of the individual components. Thus, aliphatically-linked SO$_3$M groups, especially SO$_3$Na groups, have a considerably stronger influence in improving the solubility of the products in water than has an aromatically-linked SO$_3$M group. In addition, isophthalic acid or aliphatic dicarboxylic acids have a favourable effect on the solubility in water, but terephthalic acid has an unfavourable effect. Bis-alcohols which contain ether groups also have a favourable effect on the solubility in water, but simple bis-alcohols have an unfavourably effect. Any desired properties can be arranged by varying the quantity and the nature of the individual components.

The polyesters of the present invention have a true or colloidal solubility in water or can at least be dispersed easily without using special dispersing agents or the like. When using the polyesters of the present invention, they can also be dissolved in other solvents or it can be suitable to make a partial addition of other solvents, preferably alcohols, such as methanol or ethanol, or dipolar, aprotic solvents, such as dimethylformamide or dimethylsulphoxide. Products with a low degree of branching, e.g. the polyesters of following example 4, act above all as sizing agents or, especially, as levelling auxiliaries for polyester dyeing. Products with a higher degree of branching, e.g. the polyesters of following example 1, are particularly suitable as modifying agents for melamine resins if the branching is at polyalcohols; if they are branched at carboxylic acids, they are then particularly suitable for the manufacture of hair setting lotions.

The polyesters of the present invention are mostly produced in the manufacturing process at a pH value of 2 to 5, so that it is frequently suitable to increase the pH value to pH 6 to 7 by stirring in an aqueous solution of a base. For this purpose normally aqueous solutions of alkali hydroxides, especially sodium and potassium hydroxide or of aqueous ammonia are used. Normally, such base is employed as provides the cation already contained as M in the SO₃M groups.

When used as levelling auxiliaries in polyester dyeing, the water-soluble polyesters of the present invention exhibit a certain partial carrier action. A reversible addition reaction of the disperse dyestuff with the molecules of the auxiliary probably takes place, and this reaction is discontinued in favor of the final adsorption of the dye onto the fiber. As a result the dye is fed to the fiber very uniformly and with a certain amount of retardation and thus produces extremely level dyeings. It is surprising in this mode of action that there is no retention of dye on the auxiliary and full color strengths are obtained. It is not necessary to prolong the dyeing time. A further surprising mode of action of the polyesters of the present invention makes it possible to employ even insoluble dyes which have been inadequately finished. In the course thereof, the optimum fine state of dispersion which is necessary for dyeing is produced—even in a dye liquor heated above 100° C.—and an extremely high stability of the dye liquors is achieved at the same time. The detrimental tendency towards crystallization which is often observed with disperse dyes, is also reduced or eliminated, so that it is possible to prevent settling of the dye and its unwanted deposition on the material to be dyed.

All these factors together lead to an increase in the tinctorial yield that is obtained. By using the polyesters of the present invention as levelling auxiliaries, it has become possible to use dyes that are otherwise not suitable for dyeing wound packages. It is thus possible in many cases to use cheaper dyes with the help of the present invention.

A further considerable advantage is contributed to the rapid dyeing processes which are so much in demand.

The effect of the polyesters of the present invention is to make the absorption curves of the disperse dyes match one another. This means that with combinations of three, or even four dyes it is not necessary to take into account the individual absorption phases. Although no retarding action can be detected with high temperature dyeings and also with dyeings at 100° C., the rate of absorption of the dyes in the rapid dyeing technique is certainly reduced. In these processes large quantities of dyes are presented in a sudden manner to the polyester fibers at 130° C. at certain places in the dyeing vessel, which can lead to unevennesses. A reduced rate of exhaustion of the dyes pursuant to the present invention is advantageous in this case, since it produces level dyeings.

For dyeing with the polyesters of the present invention, the dyebaths are prepared as usual at 50°–60° C., their pH is adjusted to 5–6 by means of substances which regulate the pH and they are made ready by adding the particular polyester in quantities of 0.1–5 g/l. After the pre-dispersed, water-insoluble disperse dye is added, the bath is heated to the required dyeing temperature and dyeing is carried out for the customary dyeing time. The dyeings are finished in the usual way, for example by a reductive after-scouring. A subsequent dry heat treatment or other measures to remove residual carrier chemicals, is superfluous, since none remain on the goods. The fastness to light of the resulting dyeing is also not adversely affected by such residue.

In the rapid dyeing processes, the dyeing liquors are also brought in the customary manner to the required dyeing temperature of 120°–130° C., separately from the material to be dyed but with the addition of the polyester of the present invention. They are then run very rapidly into the dyeing apparatus containing the material to be dyed and are thus brought into rapid contact with the fiber. In the course thereof the dye is fixed in an absolutely level manner. Different rates of exhaustion of dyes are matched to one another by the polyesters of the present invention. When dyeing by the injection technique, it is of course possible to add the polyester of the present invention to the dyebath before adding the dye dispersion to it.

In the following exemplifications the temperatures are in Centigrade and the percentages are by weight and the molecular weights of the manufactured polyesters are apparent molecular weights, unless otherwise noted.

EXAMPLE 1

311 g of isophthalic acid (99% pure), 41.5 g of terephthalic acid, 132.5 g of 5-sodium-sulphopropoxy-isophthalic acid dimethyl ester, 212 g of diethylene glycol, 59 g of 1,6-hexanediol and 134 g of trimethylolpropane, without catalyst, are mixed and heated under nitrogen to 170° in the course of one hour in a 2-liter four-necked flask with ground glass joints equipped with a stirrer, a thermometer, a gas inlet tube for the nitrogen and a condenser for downward distillation. The temperature in the flask is then raised, in the course of 7 hours, by a further 10° per hour until it reaches 240°. Finally, the mixture is heated at 240°–245° for 2 hours in a water-pump vacuum of approximately 12 mm Hg, followed by 1 hour in a medium-high vacuum of approximately 0.5 mm Hg, stirring well all the time. A total of approximately 170 g of distillate (methanol, water and excess diol) are collected in the receiver. 705 g of an amber-colored residue are obtained, which can readily be diluted with water to give 2,350 g of a pale, virtually clear 30% strength solution. The molecular weight is approximately 1,420. The pH value of 4.3 is suitably increased to 6.5 by stirring in a little strong sodium hydroxide solution. If heating is carried out in vacuo at 240°–245° for a shorter time, a product of lower molecular weight is obtained; on the other hand, if heating is carried out for a longer period a product with a higher molecular weight is obtained. However, with this high proportion of trimethylolpropane, it is hardly possible to increase the molecular weight above 1,800, since cross-linking then takes place rapidly.

EXAMPLE 2

Carrying out the reaction of Example 1, but using an equivalent quantity of 5-sodium-sulphoethoxy-isophthalic acid dimethyl ester instead of 5-sodium-sulphopropoxy-isophthalic acid dimethyl ester, yields a product which is very similar to that of Example 1.

EXAMPLE 3

Carrying out the reaction of Example 1, but using 111 g of 5-sodium-sulpho-isophthalic acid dimethyl ester instead of 132.5 g of 5-sodium-sulphopropoxy-isophthalic acid dimethyl ester, yields a product also chemically very similar but which, at the same molecular weight of 1,420 is only colloidally soluble in water, because aromatic sulpho groups impart solubility in water to a markedly lesser extent than do aliphatically-linked sulpho groups. If the reaction is carried out as above, but at the end of the condensation reaction the mixture is heated at 240°–245° for 2.5 hours at ambient pressure, instead of 2 hours under a waterpump vacuum, and the heating in a medium-high vacuum is completely omitted, a product of molecular weight approximately 1,100 which forms a clear solution in water, is obtained.

EXAMPLE 4

187 g of 99% isophthalic acid, 194 g of terephthalic acid dimethyl ester, 111 g of 5-sodium-sulpho-isophthalic acid dimethyl ester, 240 g of diethylene glycol, 150 g of polyethylene glycol 600, 4 g of titanium isopropylate and 6 g of sodium methylate, are mixed and heated under nitrogen to 150° in the apparatus as in Example 1. While stirring well, the temperature in the flask is then raised to 165° in the course of 2 hours, and then to 190° in the course of a further 3 hours and the mixture is finally heated at 220°–225° for a further 4 hours. In the course thereof methanol and water distill off. The internal temperature is now lowered to 150°, 33.5 g of trimethylolpropane are added and the mixture is then heated once more at 220°–225° under nitrogen for 4 hours. It is then heated at the same temperature for a further 3 hours under a waterpump vacuum (approximately 12 mm Hg) and is finally heated for a further ½ hour in a medium-high vacuum of about 0.5 mm Hg. In the course thereof a little more water and excess diethylene glycol distill off. A highly viscous, amber-colored melt is obtained, which can, however, still be diluted easily with warm water to 3,800 g to give a viscous, 20% strength colloidal solution of polyester having a molecular weight of appr. 3,740. The pH value is 4.8 and can be adjusted to 6.5–7 by stirring in a little 25% sodium hydroxide solution.

EXAMPLE 5

If 100 g of polyethylene glycol 400 are employed in Example 4 instead of 150 g of polyethylene glycol 600, a product is obtained which is somewhat less readily soluble in water and in other respects has analogous properties.

EXAMPLE 6

If 500 g of polyethylene glycol 2000 are employed in Example 4 instead of 150 g of polyethylene glycol 600, a product is obtained which has a better solubility in water and in other respects closely analogous properties.

EXAMPLE 7

373.5 g of isophthalic acid of 99% purity, 74 g of 5-sodium-sulphonato-isophthalic acid dimethyl ester, 212 g of diethylene glycol, 59 g of 1,6-hexanediol and 120 g of trimethylolethane are heated under nitrogen to 170°, without the addition of a catalyst, and in the same apparatus as in Example 1. The internal temperature is then raised by about 10° per hour to 240° in the course of 8 hours. Methanol and water distill off in a continuous stream. Finally, a vacuum of approximately 12 mm Hg is applied at 240°–245° for a further 2 hours. In the course thereof, a further distillation of approximately 65 g of colorless oil, mainly excess diethylene glycol, takes place. 672 g of a viscous, amber-colored residue remain, which can easily be diluted with warm water to 2,240 g to give a pale, clear, 30% strength solution. This solution has a pH value of 4.1 and can conveniently be neutralized by stirring with a very little strong sodium hydroxide solution. The molecular weight of the polyester is 1,270.

EXAMPLE 8

If 31 g of ethylene glycol are employed in Example 7 instead of the hexanediol, a product with analogous properties is obtained.

EXAMPLE 9

If 38 g of 1,2-propanediol or 1,3-propanediol, or 45 g of 1,4-butanediol, or 67 g of dipropylene glycol, or 57 g of 1,4-cyclohexanediol or 99 g of

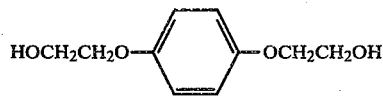

or 169 g of

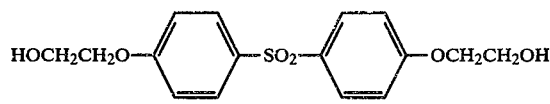

are employed in Example 7 instead of the hexanediol, products with somewhat modified properties are obtained.

EXAMPLE 10

290.5 g of 99% isophthalic acid, 86 g of 1,3-cyclohexanedicarboxylic acid, 74 g of 5-sodium-sulpho-isophthalic acid dimethyl ester, 212 g of diethylene glycol, 59 g of 1,4-hexanediol and 92 g of glycerol are mixed and heated under carbon dioxide to 170° in the course of 2 hours, without the addition of a catalyst, and while stirring very vigorously the temperature in the flask is then raised further by 10° per hour to 240°. Stirring is then continued at 240°–245° for a further 1 hour and 20 minutes under a waterpump vacuum (approximately 12 mm Hg). Methanol, water and, finally, the excess diethylene glycol distill off during the polycondensation reaction. 662 g of an amber-colored polycondensate remain, which solidifies on cooling to give a brittle resin that can be pulverized easily. It is readily soluble in water and is preferably used as a 30% strength aqueous solution. The apparent molecular weight is 1,170. The 30% solution of this resin has a pH of 5.4 and can easily be neutralized by stirring in a very little strong sodium hydroxide solution.

EXAMPLE 11

A similar product, but one which is even more readily soluble in water, is obtained if 88.5 g of 5-sodium-sulphopropoxy-isophthalic acid dimethyl ester are employed in Example 10 instead of the 5-sodium-sulpho-isophthalic acid dimethyl ester.

EXAMPLE 12

Valuable, water-soluble polyesters with similar properties are also obtained if an equivalent quantity of succinic acid diethyl ester, succinic anhydride, maleic anhydride, fumaric acid dipropyl ester, glutaric acid or adipic acid are employed in Example 10 instead of the cyclohexanedicarboxylic acid.

EXAMPLE 13

Using the procedure described in Example 1, 164.25 g (1.125 mols) of adipic acid, 194 g (1 mol) of terephthalic acid dimethyl ester, 111 g (0.375 mol) of 4-sodium-sulpho-phthalic acid dimethyl ester, 240 g (2.25 mols) of diethylene glycol and 150 g (0.25 mol) of polyethylene glycol 600, as well as 4 g of titanium tetraisopropylate and 6 g of sodium methylate as the catalyst mixture, are initially mixed and are heated, under nitrogen, to 150° in the course of 2 hours, then to 165° in the course of 2 more hours, then to 195° in the course of 3 further hours, then to 220° in the course of one additional hour and are then heated at 220°-225° for a further 4 hours. Methanol and water distill off. The mixture is now cooled to 150° and 17 g of pentaerythritol are mixed in at this temperature, and the new mixture is then heated again at 220°-225° for 4 hours while stirring well and under nitrogen, and finally a vacuum of approximately 10 mm Hg is applied at the same temperature for a further 4 hours and the condensation reaction is thus brought to an end. 738 g of residue remain, which can readily be diluted with water to 3,700 g to give a 20% strength colloidal solution. The pH of this solution is approximately 4.1 and it is neutralized to approximately pH 6 with a little 25% strength NaOH. The apparent molecular weight of the product is approximately 1,900.

EXAMPLE 14

If an equivalent quantity of isophthalic acid dimethyl ester is employed in Example 13 instead of the terephthalic acid dimethyl ester, a product with somewhat modified properties is obtained.

EXAMPLE 15

If an equivalent quantity of 2-sodium-sulpho-terephthalic acid dimethyl ester, or of 5-sodium-sulpho-isophthalic acid dimethyl ester N-methyltauride, or of the sodium salt of 5-sulphopropoxy-isophthalic acid dimethyl ester, or of 5-sodium-sulpho-isophthalic acid dimethyl ester is employed in Example 13 instead of the 4-sodium-sulpho-phthalic acid dimethyl ester, valuable products with somewhat different solubilities in water are obtained.

EXAMPLE 16

Using the apparatus described in Example 1, 290.5 g (1.75 mols) of 99% isophthalic acid, 132.5 g (0.357 mol) of 5-sodium-sulphopropoxy-isophthalic acid dimethyl ester, 72 g (0.375 mol) of trimellitic anhydride and 265 g (2.5 mols) of diethylene glycol are heated, under nitrogen and without the addition of catalyst, as follows: to 150° in the course of one hour, to 165° in the course of a further 2 hours, to 190° in the course of a further 3 hours and to 220° in the course of one additional hour, and then at 220°-225° for 3 hours. Methanol and water distill off and the melt becomes increasingly more viscous. Continuous stirring is maintained. Finally, the mixture is heated at 220°-225° for a further 3 hours under a waterpump vacuum of 10-12 mm. 660 g of an amber-colored residue remain, which can readily be diluted with water to 3,300 g to give a 20% strength, somewhat milky solution with a pH of 3.0. It is suitably neutralized with a little strong sodium hydroxide solution and is generally completely clarified by this means. Residues of cloudiness which may be present can be removed easily by stirring with 1-2% of kieselguhr and pressing the mixture through a pressure filter. The apparent molecular weight is 1,430.

If the reaction time is shortened during the last hours under vacuum, a lower-molecular product is obtained. If, for example, the mixture is heated for only one hour under the waterpump vacuum, under otherwise identical conditions, the product exhibits a molecular weight of approximately 960.

EXAMPLE 17

Using the apparatus of Example 1, 290.5 g (1.75 mols) of 99% isophthalic acid, 111 g (0.375) of 5-sodium-sulpho-isophthalic acid dimethyl ester, 78.8 g (0.375 mol) of hemimellitic acid, 212 g (2.0 mols) of diethylene glycol, 37.5 g (0.25 mol) of triethylene glycol and 29.5 g (0.25 mol) of 1,6-hexanediol, together with 3 g of titanium tetraisopropylate as the catalyst, are heated under nitrogen as follows: to 150° in the course of 1 hour, to 165° in the course of 2 more hours, to 190° in the course of 3 further hours, to 220° in the course of 1 additional hour, and then at 220°-225° for 2 hours. The mixture of a little methanol and water which has distilled off is removed and the residue is then heated further for one hour more at 220°-225° under a vacuum of 10-12 mm Hg. 635 g of a pale residue are obtained, which is best diluted while still warm, with water to 2,160 g to give a 30% strength solution. The pH value is only 3.1 and the mixture is, therefore, suitably neutralized with a little strong sodium hydroxide solution. The apparent molecular weight is 1,190.

EXAMPLE 18

If an equivalent quantity of the methyltauride

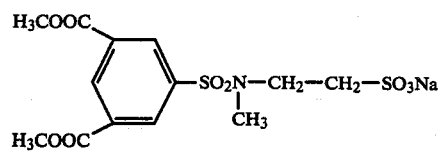

is employed in Example 17 instead of the 5-sodium-sulpho-isophthalic acid dimethyl ester, a product which is somewhat more readily soluble in water is obtained.

EXAMPLE 19

If the same quantity by weight of 2-sodium-sulpho-terephthalic acid dimethyl ester or 4-sodium-sulpho-phthalic acid dimethyl ester is used in Example 17 instead of 5-sodium-sulpho-isophthalic acid dimethyl ester, desirable products with somewhat modified properties are obtained.

EXAMPLE 20

Using the apparatus of Example 1, 311 g of isophthalic acid, 111 g of 5-sodium-sulpho-isophthalic acid dimethyl ester, 54.5 g of pyromellitic dianhydride and 265 g of diethylene glycol are subjected to a condensation reaction as follows: the mixture is first heated under nitrogen to 150° in the course of one hour and the temperature is then raised by 10° per hour until a temperature of 210° is finally reached after 6 more hours. The mixture is then heated under nitrogen at 210°-215° for a further 2 hours and a vacuum of 10-12 mm is then applied for 10 minutes. There is obtained 640 g of an amber-colored residue which dissolves in pure water to give a milky, colloidal solution with a pH value of approximately 2.2. The pH of this solution is suitably adjusted to 6.0 with approximately 85 ml of 25% strength sodium hydroxide solution, as a result of which the solution acquires an appearance as clear as that of water and, when diluted to 2,140 g, gives a 30% strength formulation. The apparent molecular weight is only about 730 in spite of the relatively high viscosity.

This product is very suitable as a hair setting lotion for human hair or for animal hair.

EXAMPLE 21

A product similar to that in Example 20 is obtained if the isophthalic acid in Example 20 is wholly or partly replaced by an equivalent quantity of its dimethyl, diethyl, dipropyl or dibutyl ester. The higher the proportion of ester in these products, the less acid is the final product.

Excellent products with modified properties are obtained if half of the diethylene glycol in Example 20 is replaced by one or more other bis-alcohols, for example by mixtures of:
- (b) 90 mol percent diethylene glycol and 10 mol percent polyethylene glycol 1000,
- (c) 80 mol percent diethylene glycol and 20 mol percent polyethylene glycol 400,
- (d) 70 mol percent diethylene glycol and 30 mol percent polyethylene glycol 300 or
- (e) 60 mol percent diethylene glycol; 10 mol percent dipropylene glycol, 10 mol percent monoethylene glycol and 20 mol percent polyethylene glycol 600.

EXAMPLE 22

Using the apparatus of Example 1, 207.5 g of isophthalic acid, 97 g of terephthalic acid dimethyl ester, 74 g of 5-sodium-sulpho-isophthalic acid dimethyl ester, 96 g of citric acid, 265 g of diethylene glycol and 2 g of titanium tetraisopropylate are heated under nitrogen to 150° in the course of one hour and are then heated to 165° in the course of 2 further hours, to 190° in the course of 3 more hours and to 220° in the course of a further hour and are then heated at 220°–225° for 2 hours and finally at 220°–225° under a vacuum of 10–12 mm Hg for a further half hour. In the course thereof methanol and water distill off. The residue is 590 g of a brownish melt which can be diluted easily with water to 1,970 g to give a 30% solution with a pH of 3.1. Because this strong acidity can impair the stability of the aqueous solution, it is suitable first to dilute it with water to only 1,870 g, then neutralize the diluted material with 25% sodium hydroxide solution, and finally complete the dilution with the amount of water still needed to adjust the solids content to 30%. A slight turbidity can be removed by stirring the diluted material with 20 g of kieselguhr and forcing the resulting mixture through a pressure filter. The molecular weight of this polyester is 1,510.

EXAMPLE 23

A product similar to that in Example 22 is obtained if an equimolar amount of tartaric acid is substituted for the citric acid of Example 22.

EXAMPLE 24

A mixture of 290 g of isophthalic acid, 24.5 g of maleic anhydride, 265 g of diethylene glycol and 0.7 g of di-tert.-butyl-hydroquinone is heated under nitrogen to 160° in the course of one hour, while stirring well. The mixture is then heated further as follows: to 180° in the course of one further hour, to 200° in the course of an additional hour and to 220° in the course of yet another hour, and it is then heated at 220°–225° for 2 hours. The mixture is now cooled to 150° and 96 g of trimellitic anhydride are stirred in, in portions, at this temperature in the course of half an hour. The mixture is then heated again to 220° in the course of one hour and the resulting reaction mixture well stirred for 2 hours at 220°–225°. A water-pump vacuum of 10–15 mm Hg is then applied and is maintained for a further half hour at this temperature. 598 g of a viscous, amber-colored residue are obtained, which is allowed to cool to 100° in vacuo. Only then is the vacuum released and nitrogen is once more passed through the apparatus. A solution of 50 g of sodium bisulphite in 100 ml of water is now (at 100°) stirred in in the course of one hour. Stirring is continued for a further 3 hours at 100° and the mixture is finally diluted with water to 3,240 g. A 20% strength aqueous solution which is nearly clear, but still acid, is obtained and the pH is at once adjusted to 6.5 with approximately 80 ml of 25% sodium hydroxide solution in order to avoid hydrolysis. The molecular weight of this polycondensate is 1,400.

EXAMPLE 25

If an equivalent quantity of itaconic anhydride is used in Example 24 instead of the maleic anhydride, a product with analogous properties is obtained.

EXAMPLE 26

If, in Example 24, 0.25 mol of the diethylene glycol is replaced by an equivalent quantity of polyethylene glycol 300, 600 or 1,000, effective products with somewhat modified properties are obtained.

EXAMPLE 27

Using the apparatus of Example 1, 207.5 g of isophthalic acid, 111 g of 5-sodium-sulfonato-isophthalic acid dimethyl ester, 37 g of maleic anhydride, 159 g of diethylene glycol, 90 g of 1,4-butanediol, 1 g of titanium isopropylate and 1 g of di-tert.-butylhydroquinone are mixed and heated under a nitrogen atmosphere as follows: first to 150° in the course of one hour, then the temperature is raised by 15° per hour to 220° and it is then kept at 220°–225° for 4 hours. The mixture is now cooled to 150° and 96 g of trimellitic anhydride are stirred in, in portions, in the course of half an hour (under nitrogen). The resulting mixture is then heated again to 200°, following which it is heated at 200°–210° for 1 hour, at 210°–220° for one hour and at 220°–225° for 2 hours and, finally, a water pump vacuum of 10–15 mm is applied for a further half hour at the last-named temperature. The viscous melt is then allowed to cool to 100° and an aqueous solution of 75 g of sodium bisulphite in 150 g of water is then stirred in (under nitrogen!) in the course of one hour. Heating is then continued at 100° for a further 3 hours and the viscous slurry is then diluted with water to give a 20% strength solution and the pH is adjusted to approximately 6.5 with 25% strength sodium hydroxide solution. The molecular weight of the somewhat colloidal solution is 1,550.

EXAMPLE 28

Using the apparatus of Example 1, 246.35 g (1.275 mols) of isophthalic acid dimethyl ester, 70.2 g (0.225 mol) of potassium sulpho-isophthalic acid dimethyl ester, 202.5 g (1.35 mols) of triethylene glycol, 3 g of titanium isopropylate and 4 g of potassium methylate are mixed and heated under a nitrogen atmosphere to 130° in the course of 1 hour, while stirring well, and methanol begins to distill off. The reaction temperature is raised by 15° per hour, up to 220°. The mixture is then stirred for a further 4 hours at 220°-225°, first under nitrogen and finally, for a further 8 hours under a vacuum of 10-15 mm. The internal temperature is now reduced to 150° and 36 g (0.3 mol) of trimethylolethane are stirred in, in portions, at this temperature in the course of a quarter of an hour. The resulting mixture is then heated at 210°-215° for 4 hours under nitrogen and, finally, a vacuum of 10-15 mm is applied for a further hour at this temperature. A very viscous melt is obtained, which can be diluted with water to give a clear, 20% solution with a certain amount of turbidity of a colloidal nature. The molecular weight of the polycondensate obtained in this way is 2,200.

EXAMPLE 29

If only 122.5 g (0.75 mol) of triethylene glycol are employed in Example 28 instead of 202.5 g, but 53.1 g (0.45 mol) of 1,6-hexanediol and 90 g (0.15 mol) of polyethylene glycol 600 are added to the original reaction mixture, a distinctly more viscous polycondensate is obtained.

EXAMPLE 30

A mixture of 145.5 g of isophthalic acid dimethyl ester, 87.3 g of terephthalic acid dimethyl ester, 106.2 g of sodium 1,2,4-benzenetricarboxylic acid trimethyl ester 5-sulphonate, 174.9 g of diethylene glycol and 3 g of titanium tetraisopropylate is heated under nitrogen to 150° in the course of one hour. The reaction temperature is then raised by 15° per hour. Methanol distills off. Heating is then continued for 2 more hours at 205°-210° and, finally a water pump vacuum of approximately 12 mm is applied for a further 15-30 minutes until the mixture becomes highly viscous. The mixture is now cooled to 120° and is then diluted with water to give a 20% strength solution. This solution is as clear as water and highly fluid. It exhibits a pH value of approximately 4.5 which is increased to 6.0-6.5 by the addition of a few drops of 25% strength sodium hydroxide solution. The molecular weight of this polycondensate is between 1,300 and 1,400.

EXAMPLE 31

A liquor which has been prepared from soft water with a pH of 4.5 (adjusted with acetic acid) and 0.5 g per liter of the branched water-soluble polyester of Example 1, is allowed to flow, at 130° C. and at a liquor ratio of 1:10, through wound muffs of texturized polyester yarn, in a HT dyeing apparatus.

A mixture, pre-dispersed in 100 grams water at 40° C., of the following disperse dyes is added rapidly to this liquor by means of an injection apparatus:
0.46% of the dye

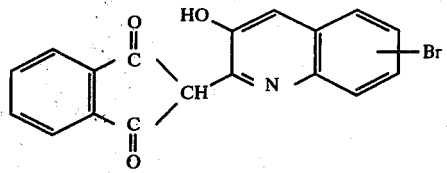

0.52% of the dye

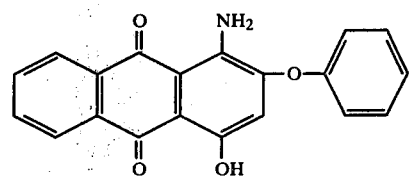

0.17% of equal parts of

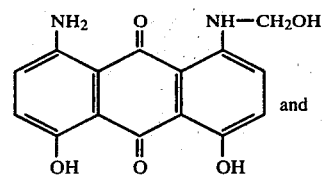

and

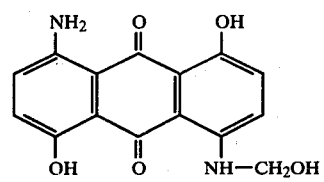

The total quantity of liquid flowing through the muff is 20 liters per kilogram of fiber per minute. After 30 minutes treatment during which the dye liquor is heated to 130° C., the goods are cooled, the liquor is run off and reductive scouring is carried out.

A completely level brown dyeing is obtained with a full tinctorial yield.

If the same dyeing is carried out with the same dyes under identical conditions, but without adding the water-soluble, branched polyester and using the commercially available dispersing agent formed by reacting naphthalenesulphonic acid with formaldehyde, as well as levelling auxiliaries composed of a fatty acid polyglycol ester, polyglycol and oxethylated alkylphenols, an uneven dyeing is obtained, with sharp differences in the depth of color and in the color shade of the individual muffs.

EXAMPLE 32

The procedure followed is as in Example 31, but the branched, water-soluble polyester of Example 3, is used instead of that of Example 1. Dyeing is carried out at 130° C. for 30 minutes and a completely level brown dyeing is obtained with the branched polyester only.

EXAMPLE 33

Dyeing is carried out by following the procedure described under Example 31, but using
0.4% of the disperse dye

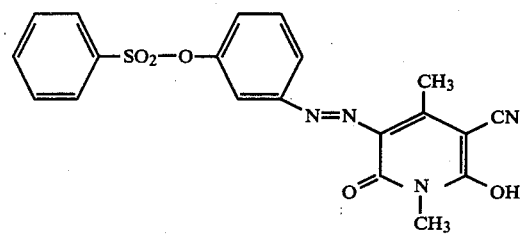

0.32% of the disperse dye

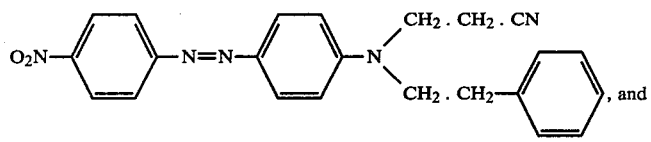

0.26% of the dye

X = 40%—H
60%—CH₃

Dyeing is carried out at 130° C. for 25 minutes, a reductive after-treatment is carried out and a level brown dyeing is obtained with the branched, water-soluble polyester. When the polyester is replaced by a commercially available dispersing and levelling agent, an uneven dyeing with sharp differences in depth of colour and colour shade is obtained.

EXAMPLE 34

(a) Comparison

A dyeing liquor which consists of soft water adjusted to pH 5 with acetic acid and which contains 0.5 g/l of sodium 2,2'-dinaphthylmethane-6,6'-disulphonate is allowed to flow, at 80° C. and at a liquor ratio of 1:12, through muffs of texturized polyester threads, in a HT dyeing apparatus.

1.5% relative to the weight of the goods, of the disperse dye

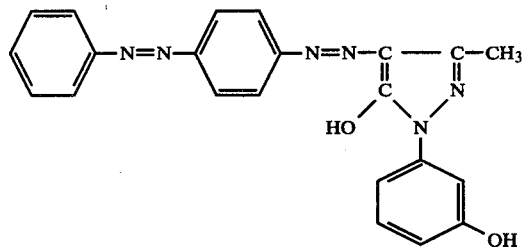

in its liquid, commercially available prepared form are added to this liquor. The dyebath is heated to 130° C. in the course of 40 minutes and dyeing is carried out at this temperature for 30 minutes. The goods are then given a hot rinse and a reductive after-treatment, but level dyeing is not obtained.

(b) Example

If the sodium 2,2'-dinaphthylmethane-6,6'-disulphonate in the dyeing described above is replaced by 0.3 g/l of the water-soluble, branched polyester of Example 22 and if the process followed is exactly the same as that described above, a level, golden yellow dyeing which is fast to rubbing is obtained, without deposits on the goods.

The dye of this example was previously not suitable for disperse dyeing of polyester yarn.

EXAMPLE 35

The procedure described in Example 34 (b) is followed, but using 2% of the red disperse dye

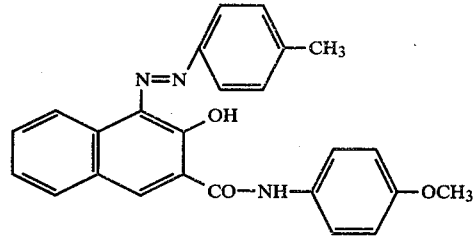

in its commercially available form, and using 0.7 g/l of the water-soluble polyester of Example 24.

A level, brilliant scarlet dyeing which is fast to rubbing is obtained.

If the same dyeing is carried out with the water-soluble, branched polyester replaced by the condensation product obtained from formaldehyde and cresol, an unusable, uneven dyeing is obtained which is not fast to rubbing owing to localized deposit of dye on the fiber.

EXAMPLE 36

The procedure of Example 31 is repeated, but using the dye of Example 35. A vivid, level scarlet dyeing which is fast to rubbing is obtained when the water-soluble, branched polyester is used, but not when it is replaced by the prior art dispersing agent.

Obviously many modifications and variations of the present invention are possible in the light of the above teachings. It is, therefore, to be understood that within the scope of the appended claims the invention may be practiced otherwise than as specifically described.

What is claimed:

1. A water-soluble polyester having an apparent molecular weight of from about 600 to about 5,000 which is the esterification reaction product of
    (a) dicarboxylic acid;
    (b) diol comprising at least 40 mole percent of diethylene glycol, triethylene glycol or a mixture thereof based on the total —OH reactant; and
    (c) a branching component selected from the group consisting of polycarboxylic acid having 3 to 5 carboxyls, polyol having 3 to 5 hydroxyls and hydroxycarboxylic acid having at least one carboxyl and at least one hydroxyl and having a total of carboxyl and hydroxyl of 3 to 5 in an amount sufficient to produce a polyester having 5 to 40 mole percent branching component;

with the proviso that the polyester also contains 5 to 40 mole percent of —SO$_3$M based on the molar amount of total esterified carboxylic acid and wherein M is a cation of an alkali metal, an organic amine or ammonium.

2. The combination of claim 1 in which the SO$_3$M content is from about 10 to 30 mol percent.

3. The combination of claim 1 in which the branching component is an at least trifunctional polycarboxylic acid, polyhydroxy compound or hydroxycarboxylic acid.

4. The combination of claim 1 in which the dicarboxylic acid is oxalic acid, malonic acid, succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, fumaric acid, maleic acid, itaconic acid, 1,2-cyclohexanedicarboxylic acid, 1,3-cyclo-hexanedicarboxylic acid, 1,4-cyclohexanedicarboxylic acid, norbornanedicarboxylic acid, phthalic acid, isophthalic acid, terephthalic acid, 1,4-naphthalenedicarboxylic acid, 2,5-naphthalenedicarboxylic acid, diphenic acid, diglycollic acid, thiodipropionic acid, 4,4'-oxydibenzoic acid, sodium-sulphosuccinic acid, potassium-sulphosuccinic acid, ammonium-sulphosuccinic acid, 4-sodium-sulphophthalic acid, 4-sodium-sulphophthalic anhydride, 4-potassium-sulphophthalic acid, or 2-sodium-sulphoterephthalic acid.

5. The combination of claim 1 in which the diol is ethylene glycol, 1,2-propanediol and 1,3-propanediol, butanediols, pentanediols, hexanediols, 1,10-decanediol, di-ethylene glycol, dipropylene glycol, triethylene glycol, tetra-ethylene glycol, tripropylene glycol, polyethylene glycol of molecular weight 300–2,000, bis-(4-hydroxybutyl) ether, 2-methylene-1,3-propanediol, 2,4-dimethyl-2-ethyl-1,3-hexanediol, 2-ethyl-2-butyl-1,3-propanediol, 2,2-dimethyl-1,3-propanediol, 2-ethyl-2-isobutyl-1,3-propanediol, 2,2,4-trimethyl-1,6-hexanediol, 1,3-dihydroxy-cyclohexane, 1,4-dihydroxy-cyclohexane (quinitol), 1,4-bis-(hydroxymethyl)-cyclohexane, 1,3-bis-(hydroxymethyl)-cyclohexane, 1,2-bis-(hydroxymethyl)-cyclohexane, 1,4-bis-(hydroxymethyl)-benzene, 1,3-(hydroxymethyl)-benzene, 2,6-bis-(hydroxymethyl)-naphthalene,

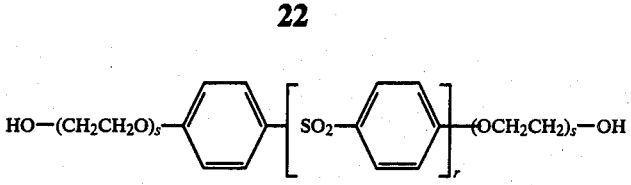

wherein r is 0 or 1 and s is 1, 2, 3 or 4,

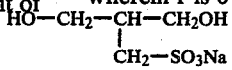

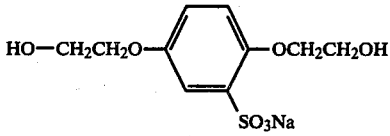

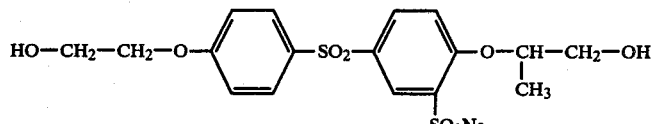

6. The combination of claim 1 in which the branching component is an at least trifunctional polycarboxylic acid selected from the class consisting of trimellitic acid, trimesic acid, hemimellitic acid, mellophanic acid, prehnitic acid, pyromellitic acid, aconitic acid, tricarballylic acid, ethanetetracarboxylic acid, 1,2,3-cyclohexanetricarboxylic acid, 1,2,4-cyclohexanetricarboxylic acid, 1,3,5-cyclohexanetricarboxylic acid and naphthalenetricarboxylic acid.

7. The combination of claim 1 in which the branching component is an at least trifunctional polyhydroxy component selected from the class consisting of glycerol, erythritol, pentaerythritol, trimethylolpropane and trimethylolethane.

8. The combination of claim 1 in which the branching component is an at least trifunctional hydroxycarboxylic acid selected from the class consisting of citric acid, malic acid and tartaric acid.

9. The combination of claim 1 in which an equivalent portion of the diols and dicarboxylic acids is replaced by a hydroxycarboxylic acid.

10. The combination of claim 1 in which an equivalent portion of the diols and dicarboxylic acids is replaced by a hydroxycarboxylic acid selected from the class consisting of glycollic acid, lactic acid, 3-hydroxypropionic acid, 4-hydroxybutyric acid, 5-hydroxy-3-pentenoic acid, mandelic acid, 3-hydroxymethyl-cyclohexane-carboxylic acid, 4-hydroxymethyl-cyclohexane-carboxylic acid and 6-hydroxymethyl-decalin-2-carboxylic acid, citric acid, malic acid, tartaric acid,

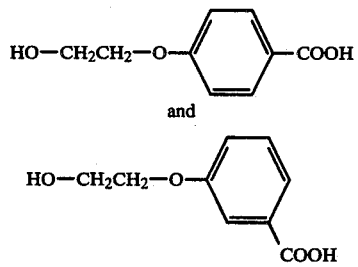

11. In the method of dyeing textile fiber with at least one disperse dye and with the help of a dye-leveling auxiliary, the improvement according to which the auxiliary is the improved polyester of claim 1.

* * * * *